April 4, 1961   W. E. A. RADFORD   2,977,826
MACHINE TOOLS AND OTHER MACHINES FOR CARRYING
OUT A SEQUENCE OF OPERATIONS
Filed May 8, 1959   9 Sheets-Sheet 1

INVENTOR
WILLIAM E.A. RADFORD
BY
Irwin S. Thompson
ATTORNEY

April 4, 1961 W. E. A. RADFORD 2,977,826
MACHINE TOOLS AND OTHER MACHINES FOR CARRYING
OUT A SEQUENCE OF OPERATIONS
Filed May 8, 1959 9 Sheets-Sheet 6

INVENTOR
WILLIAM E. A. RADFORD
BY
Irwin S. Thompson
ATTORNEY

INVENTOR
WILLIAM E. A. RADFORD
BY
Irvin S. Thompson
ATTORNEY

April 4, 1961 W. E. A. RADFORD 2,977,826
MACHINE TOOLS AND OTHER MACHINES FOR CARRYING
OUT A SEQUENCE OF OPERATIONS
Filed May 8, 1959 9 Sheets-Sheet 9

INVENTOR
WILLIAM E. A. RADFORD
BY
Irwin S. Thompson
ATTORNEY

United States Patent Office 2,977,826
Patented Apr. 4, 1961

2,977,826

MACHINE TOOLS AND OTHER MACHINES FOR CARRYING OUT A SEQUENCE OF OPERATIONS

William E. A. Radford, Harrow, England, assignor to Engineering Research and Application Limited, Dunstable, England Filed May 8, 1959, Ser. No. 812,062

Claims priority, application Great Britain May 12, 1958

4 Claims. (Cl. 77—32.3)

This invention relates to machine tools and other machines for carrying out a sequence of operations involving advance movements to progressively varied extents alternating with retraction movements. The main object of the invention is to provide an improved control apparatus for this purpose. A particular example is for drilling machines in which it is desired to drill holes of considerable length in relation to their diameter. The invention can however be used for carrying out other operations.

In applying the invention to a drilling machine, the drill is advanced for a predetermined distance into the material and then retracts for a predetermined distance in order to provide clearance of the drill, whereafter the drill advances again into the work and after drilling a further predetermined distance, clears itself once more. A variable number of such operations (known as pecking or relief operations) is desirable.

A further object of the invention is to enable the machine to carry out successive advance movements when required and which can be utilised when required for effecting a single advance and return operation.

According to the invention the apparatus comprises a series of projections carried by a movable device and projecting therefrom to varying extent, means whereby these projections effect return movements of an operating member, and means controlled by these return movements to effect progressive control movements of said movable device to bring the projections successively into operation.

The control movements may consist of successive rotary movements of said movable member, said projections being mounted on said movable member in the form of an annular series.

Preferably, the movable device is movable with the operating member and carries a second series of projections which control the change-over from return movements to forward movements.

A constructional form of the invention will now be described by way of example with reference to the accompanying diagrammatic drawings which illustrate a drilling machine made in accordance with the invention. In the drawings.

The machine includes three systems, viz:

(a) Electrical

The electrical part of the machine consists of an electric motor 10 (Figure 5) which drives a spindle 11 on which is splined a sleeve 12 which constitutes a tool holder and can carry a drill chuck. A hollow quill 14 surrounds the sleeve 12 and carries bearings 15 and 16 which carry the sleeve 12. The spindle 11 is carried in bearings 18 and 19 so that the motor 10 will rotate the shaft 11 and via the spline cause rotation of the sleeve 12 and drill chuck thereon. Secure assembly of the bearings on to the whole sleeve 12 is obtained by locking rings 20 and 21.

(b) Pneumatic

The pneumatic part of the machine operates from a normal machine shop compressed air supply and this provides the motive force for the advance and retraction of the drill. This part of the machine does not, however, control the speed of operation.

(c) Hydraulic

The movements effected by the air pressure are controlled as to speed by an hydraulic cylinder and piston device and the flow of liquid into or out of the cylinder is controlled according to a set of programmed speeds.

Figure 1:
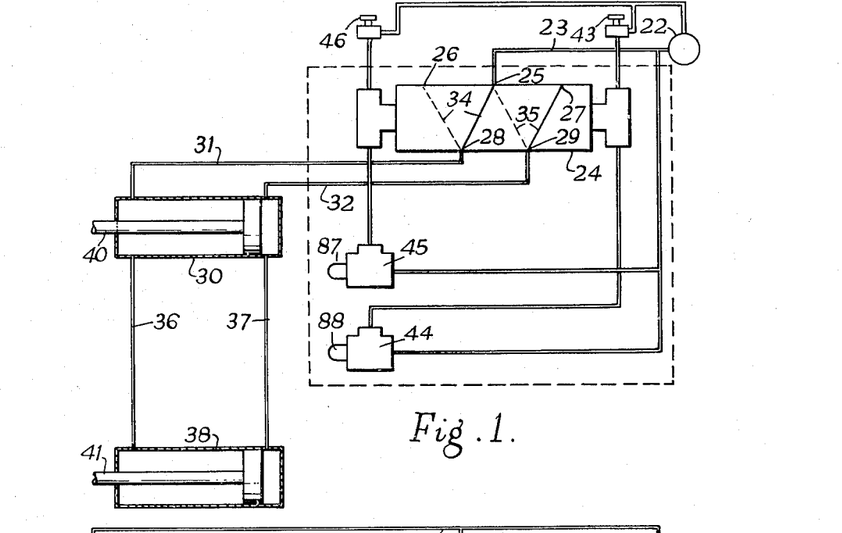
Figure 1 is a diagram of an air circuit for effecting advance and return movements of a tool holder.

The pneumatic circuit shown in Figure 1 shows a connection 22 for a supply of compressed air which is conducted by pipe 23 to an inlet port 25 of a valve body 24. This valve body has exhaust ports 26, 27 and outlet supply ports 28, 29 leading to opposite ends of a cylinder 30 by means of pipes 31, 32. A movable valve member is indicated diagrammatically by lines 34, 35 which can move from the full line positions to the broken line positions. The cylinder 30 has its opposite ends connected by pipes 36, 37 to the opposite ends of a cylinder 38. The cylinders 30, 38 contain rams 40, 41 which act in unison on the sleeve 12 to move it axially to effect advance and return movements.

Operation of the machine may be initiated by means of a manually operated start button 43 and is controlled by piloting switches 44 and 45 and the operations may, at any time, be brought to a halt by operation of an emergency control 46.

The details of this valve 24 will be described later but the function of the valve is as follows:

Operation is initiated by pressing the start control 43. This admits air to the main spool 34, 35 of the valve 24 and moves the spool into the broken-line position to supply main air from 22, 23 to port 29; in the meantime, the spool has connected port 28 to exhaust 26. The air may now pass from the main supply at 22 through port 25 to port 29 and into the rear side of the cylinders 30, 38, thus causing the rams 40, 41 to move forward to advance the drill. Air exhausts from the front ends of the cylinders to atmosphere via ports 28, 26.

On reaching the predetermined limit of the travel of the rams, an abutment moved by the rams strikes the piloting switch 45, which changes the air supply so as to move the main valve spool 34, 35 into a position (full lines) where port 29 is connected to exhaust 27 and port 28 is connected to compressed air 25, 22. The rams are, therefore, caused to retract under the influence of the compressed air flowing through 22, 23, 31, 36 to the forward sides of the rams 40 and 41; air, meantime, being exhausted through 32, 37, 29, 27 to atmosphere.

The rams will then retract to their limiting position and, if no abutment is provided to strike piloting switch 44, the operation will cease until such time as the start button 43 is pressed, thus starting advance and retracting operation once more. However, if an abutment is provided on the rams which strikes valve 44 at the end of the retraction period, this will initiate a reversal of the main valve spool 34, 35, thus allowing the system to shuttle to and fro until such time as it is brought to a halt, for example, by operating the emergency switch 46. The cylinder 38 is sealed by plugs 50 and 51 (Figure 5) in which are arranged suitable drillings 52 and 53 communicating with annular recesses, which in turn communicate with the appropriate drilled passages communicating in turn with the air valve 24.

The quill 14 slides in bronze rings 56 and 57 which carry felt seals 58 and 59 and at its rearmost end it carries a cross-head 60 which, in turn, has bearings 61 which, in turn, carry felt rings 62 to provide a measure of sealing and wiping.

The cross-head 60 slides on torque reaction rods 64 and 65 (Figure 5), the function of these rods being to react the torque arising from the drilling operation and also to provide a steady for the rear end of the quill. In turn, the cross-head carries a platform 68 on which may be mounted a suitable arrangement of stops.

Figure 5:
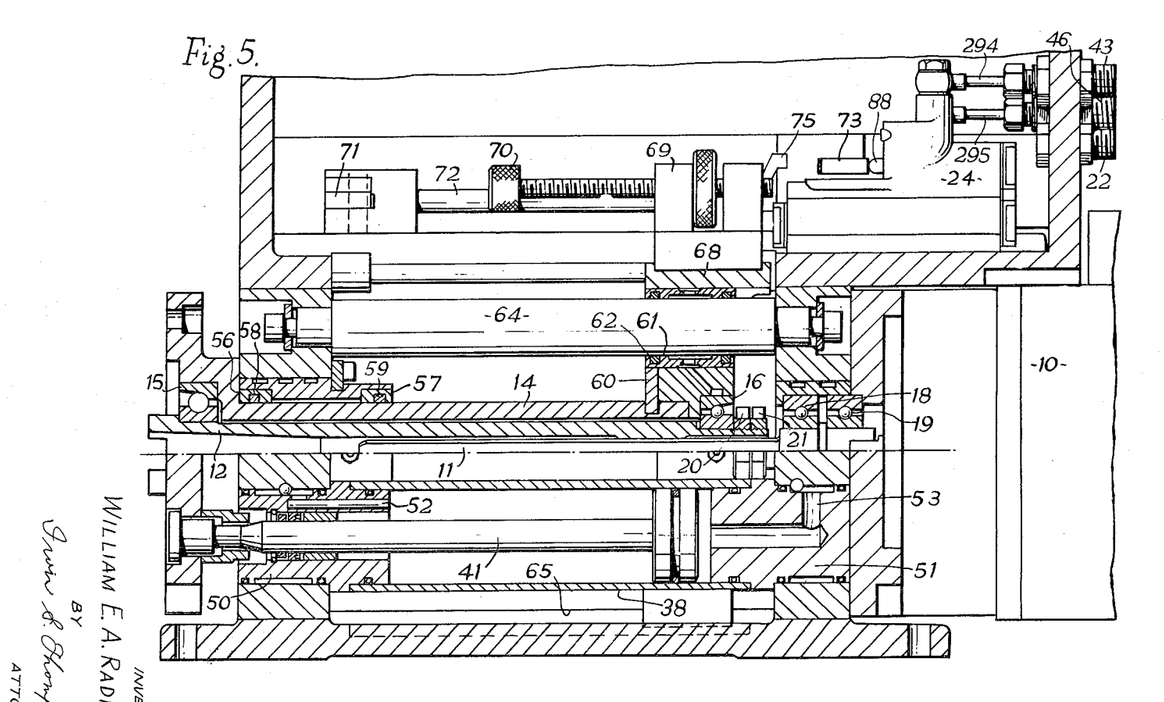
Figure 5 is a sectional view on the line 5—5 on Figure 4.
Figure 6:
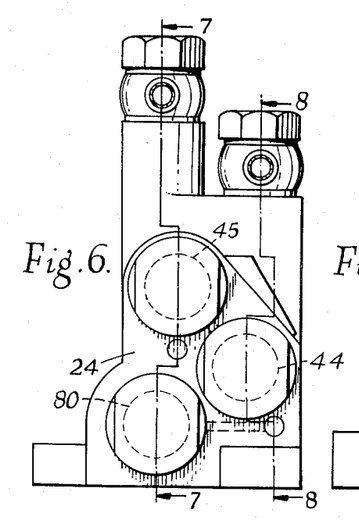
Figure 6 is an elevation of an air control valve.

Figures 5 and 6 show a simple adjustable stop carrier 69. This may be replaced when required by a pecking mechanism, providing a programmed change of stops according to the requirements of the operation.

The stop 69 carries an abutment 70 which engages a lever 71 which, in turn, operates a rod 72 which contacts piloting valve 45 (Figure 1) which, when operated, initiates retraction of the ram. A back stop is provided at 75 (Figure 5) which can engage a lever 73 which, in turn, abuts against the piloting valve 44 which intitiates forward operation of the ram. This operation is particularly required when the special programmed pecking unit is installed in place of the fixed stop.

Figure 7:
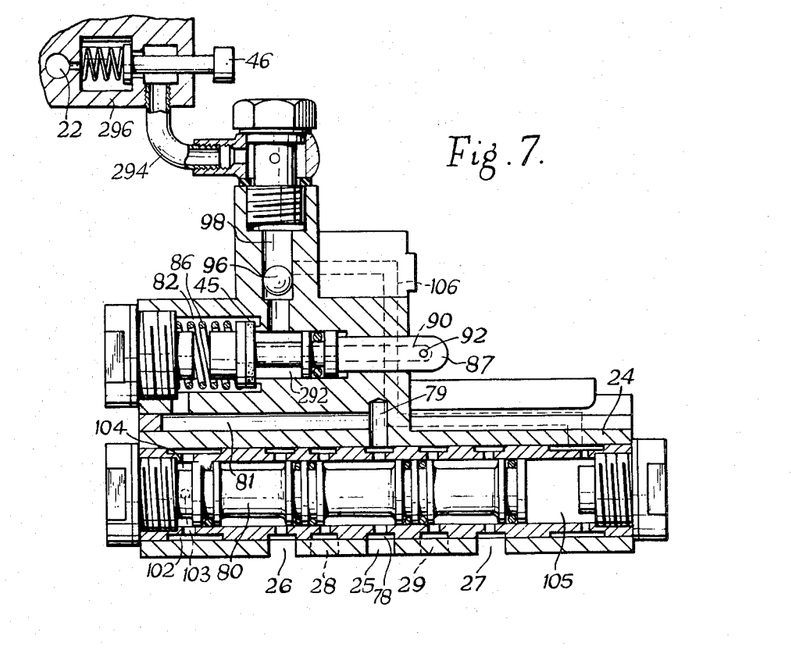
Figures 7 and 8 are sectional views on lines 7—7 and 8—8 respectively on Figure 6.
Figure 8:
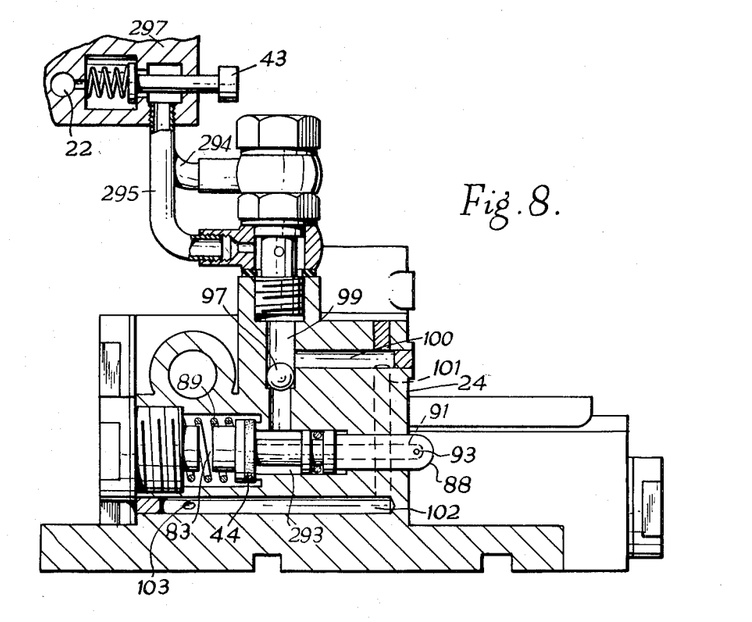

The air valve 24 is shown in Figures 6, 7 and 8. The valve itself consists of a spool 80 moving in the valve body or cylinder 24 having the multiplicity of ports 25, 26, 27, 28, 29 therein, whereby air may be fed through port 25 to ports 29 or 28 according to the position of the spool and port 29 or 28 when not connected to port 25 is connected to exhaust (26, 27).

Air supply through port 25 is always in communication with a passage 81 via annular groove 78 and duct 79. The passage 81 supplies air to two pilot valve chambers 82 and 83 which contain the pilot valves 45, 44 respectively. The air is normally sealed off in these chambers by means of the valves 44, 45 which are shown as spring loaded face valves. The valves 44, 45 when required may be raised off their seats by means of plungers 87 and 88 against the action of springs 86, 89. These plungers have internal drillings 90, 91 which permit the evacuation of excess air pressure from passages within the valve 24 through ports 92 and 93. The left hand ends of drillings 90, 91 (Figures 7 and 8) are normally closed by the face valves 44, 45.

Steel balls 96 and 97 act as shuttle valves and seal off air supply passages 98 and 99 when air is allowed to pass through the face valves 44 and 45. The chambers 82, 83 have continuations 292, 293 in communication with drillings 98, 99 which, in turn, communicate via pipes 294, 295 with valve bodies 296, 297 supplied from the main air pressure supply 22 and controlled by the normally closed spring loaded valves 43, 46. Air permitted to pass either through the face valve 44 or 45, or where appropriate under the influence of the start or emergency buttons 43, 46 through to passages 98 and 99, communicates with the respective ends of the spool 80, moving it into the required positions for advance and retraction, i.e. passage 99 connects via drillings 100, 101, 102, 103 to one end 104 of the spool. Passage 98 connects through similar drillings (106) to the other end 105 of the spool. On completion of the movement of the spool, air is permitted to flow through the appropriate port 29 or 28, to the side of the air rams selected by the action of the piloting valves 44 and 45 or the valves 43, 46.

*Oil circuit*

The function of the oil circuit is to provide a control over the speed of advance and retraction of the rams.

Figure 2:
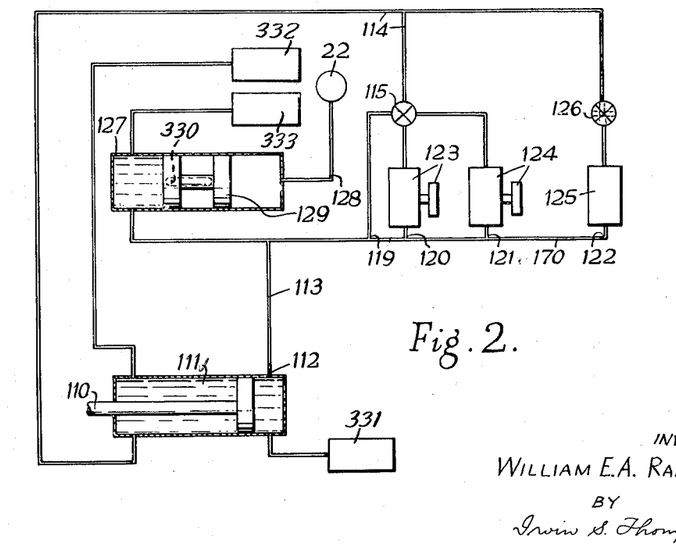
Figure 2 is a diagram of a liquid circuit constituting damping means.

Movements of the rams 30 and 38 (Figure 1) operate a cross-head 60 which, in turn, is connected to a ram 110 in an oil cylinder 111 (Figure 2). Movement of the ram 110 to the right will displace oil through a port 112 and pipe 113 through one or more valve ports 119, 120, 121, 122, adjustable speed devices 123 and 124, a non-return valve 125, shut down valves 115, 126 and return pipes 114 to the left hand end of the cylinder 111. Fast retraction of the ram is permitted under all circumstances except when valve 126 is closed.

When valve 126 is closed, the retraction speed is controlled by the control of the valve ports during the operation of the apparatus.

A supplementary supply of oil is stored in a reservoir cylinder 127 and the system is maintained under pressure by means of a compressed air supply line 128, which acts upon a piston 129 in cylinder 127, which piston in turn acts on the oil in the system, thus ensuring that the system is always kept full of oil. A tell-tale position indicator 330 attached to the piston of the reservoir gives visual indication of when the system needs replenishment with oil. Further oil may be injected through an injector 331 and air may be evacuated from the system by bleeding through valves 332 and 333.

Facilities are provided on the machine for operation of the valve to permit oil to pass either through ports 119, 120 or 121 and adjustment is made at 123 and 124 to give suitable speeds for normal drilling feed and slow "break through" (final breaking of the tool through the work).

Figure 3:
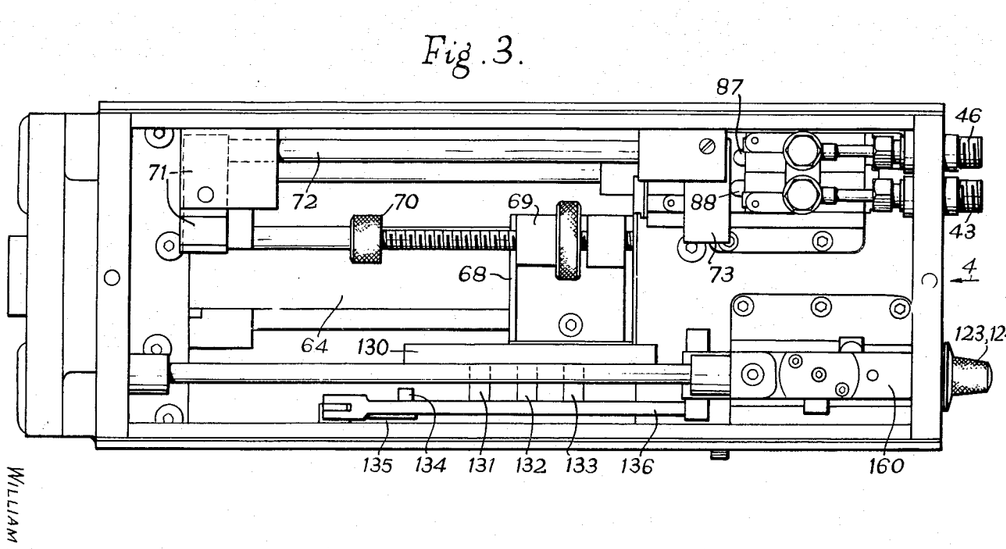
Figure 3 is a plan view of the machine.
Figure 4:
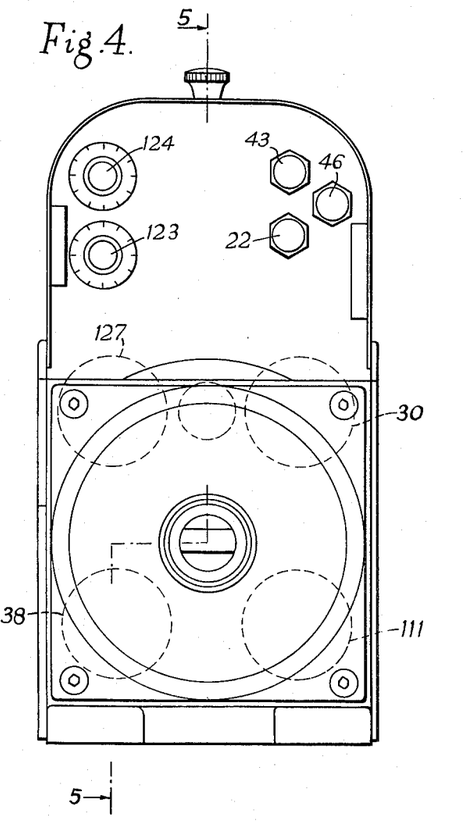
Figure 4 is an end elevation looking in the direction of the arrow 4 on Figure 3.

Attached to the moving cross-head 60 of the machine is a trip carrier 130 (Figure 3). This carries suitable cams or trips 131, 132 and 133, which engage in turn a roller 134. If required, any number of trips may be installed on the trip carrier in addition to the three shown. Engagement of the trips with the roller 134 operates a bell crank lever 135 which, in turn, moves a rod or link 136 which actuates the oil valve. According to the position in which the trips place the bell crank 135 the oil valve is adjusted to allow oil to flow through ports 119, 120 and 121, thus permitting adjustment to be made to the speed of advancement or retraction at all positions of operation.

Under normal conditions, retraction is not controlled and oil may pass freely through port 122 into the non-return valve 125, through valve 126 and back to the other side of the oil cylinder 111. However, where tapping operations are required and a slow retraction speed equal to the feed speed is required, valve 126 is closed, thus preventing back feeding of oil through port 122 and causing the oil to be back fed through ports 120 or 121, according to which is in use at the time.

Figure 15:
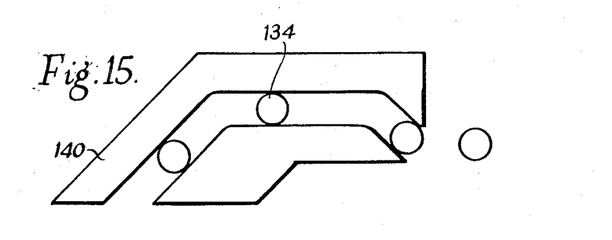
Figure 15 is a detail to be described.
Figure 16:
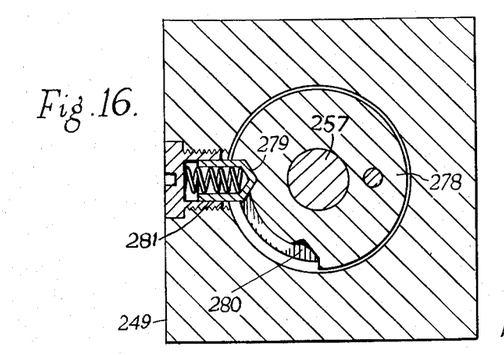
Figure 16 is a section on line 16—16 on Figure 13.

If required, the trips 131, 132 and 133 may be replaced by a cam track 140 (Figure 15); this alternative may be used where a permanent programme is required to be installed into the machine.

Figure 9:
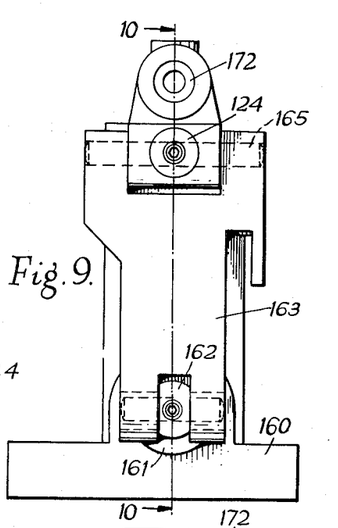
Figure 9 is an end elevation of an hydraulic valve.
Figure 10:
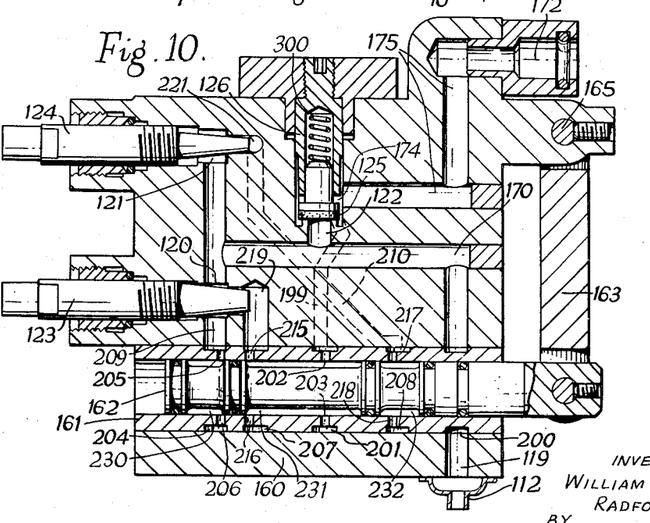
Figure 10 is a sectional view on the line 10—10 on Figure 9.
Figure 11:
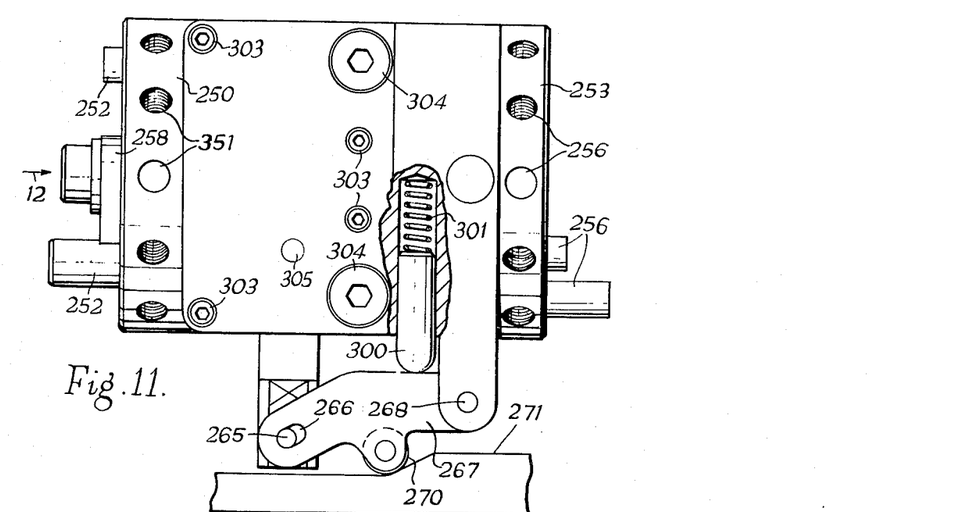
Figure 11 is a plan view of a control device for enabling the machine to produce automatically a sequence of advance movements alternating with return movements.
Figure 12:
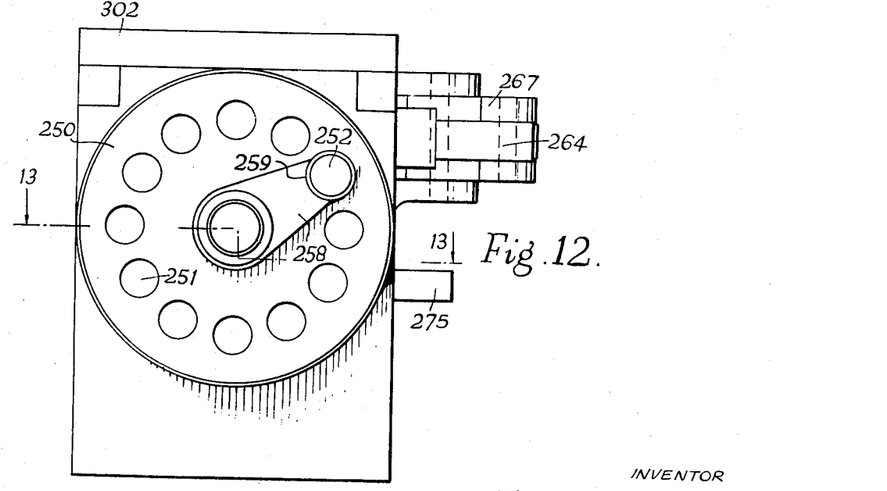
Figure 12 is an elevational view of the control device looking in the direction of the arrow 12 on Figure 11.

The oil valve is illustrated in detail in Figures 9 and 10 and consists of a body 160 carrying a sleeve 161 in which moves a spool 162. The spool is operated by means of a lever 163 rotating about a pivot 165 which is suitably connected to the bell crank lever 105 described above via the connecting link 106. The valve contains a common gallery 170 which communicates with the adjustable valves 123 and 124 and with the non-return valve 125. The non-return valve 125 is disposed in a chamber 174 which communicates directly with drillings 173, 175, the latter of which is connected by connector 172 to the front side of the oil cylinder 15. The rear side of the cylinder 111 is connected via suitable drillings in the structure of the device and via port 112 (Figure 2) to a port 119 in the base of the valve body 160 (Figures 2 and 10). Oil then traverses an annular passage 200 in a sleeve 161 and so communicates with the passage 170. A drilling 199 in the valve body 160 gives communication between the drillings 173, 175 and an annular groove 201 in the sleeve 161. This annular groove communicates via ports 202, 203 with the interior of the sleeve 161. The sleeve 161 contains a further annular groove 204 which communicates via ports 205, 206, drilling 209 and the annular space 120 with the passage 170. Annular spaces 207, 208 communicate with ports 215, 216, 217, 218 that lead to the interior of the sleeve 161. Port 217 similarly communicates via passages 210 with chamber 221 and port 215 connects by duct 219 with chamber 120. Flow between space 121 and chamber 221 and between space 120 and 219 is adjustably restricted by valves 124 and 123 respectively.

The non-return valve 125 is loaded by spring 300 and may be wholly sealed by screwing down the sleeve 126 thus inhibiting the quick return action normally provided by this device.

The pivot 165 carries the lever 163 which as explained above moves the spool 162. The spool 162 has suitably disposed annular grooves 230, 231, 232 isolated by seals. In Figure 10 the spool 162 is shown in its central position and connects ports 202, 203 to ports 215, 216 thus allowing oil to flow from one side of the ram to the other via adjustable valve 123. When the spool is moved to a position corresponding to the left hand side of sleeve 161, the arrangement of grooves and seals permits the oil to flow from ports 202, 203 to ports 204, 205, 206 in addition to ports 215, 216 thus permitting the oil to flow unhindered from one side of the cylinder 111 to the other.

In the right hand position of the spool ports 205, 204, 215, 216 are sealed off and ports 217, 218 are connected to ports 202, 203 thus causing the oil to flow via valve 124 only.

Thus the left hand position gives fast approach and fast retraction, the middle position gives normal feed approach via valve 123 and fast retraction via valve 125 and the right hand position gives slow breakthrough via valve 124 and fast retraction via valve 125.

For effecting a series of advance movements alternating with return movements the stop device 69, 70, 75 is removed from the machine and replaced by the control device shown in Figures 11 to 14. This control device comprises a body 249 which will be mounted on the cross-head platform 68 of Figure 5 so as to slide towards and away from the work. This body is provided at one end with a barrel 250 having an annular series of holes 251 therein to contain projections or pegs 252 which can be placed in any number of the holes held in position by screws (not shown) inserted into tapped holes 351. The pegs are of different lengths so that they project to progressively greater distances in the drilling direction. At the other end the body has a second barrel 253 having similar holes 255 and projections or pegs 256. The barrel 253 carries a spigot 257 which projects through the barrel 250 and carries an arm 258 which has a recess 259 at its outer end which can be engaged on any of the pegs 252 whereby the barrels 250 and 253 can be set at any required position (rotatably about the axis of the spigot 257) in relation to each other.

Figure 13:
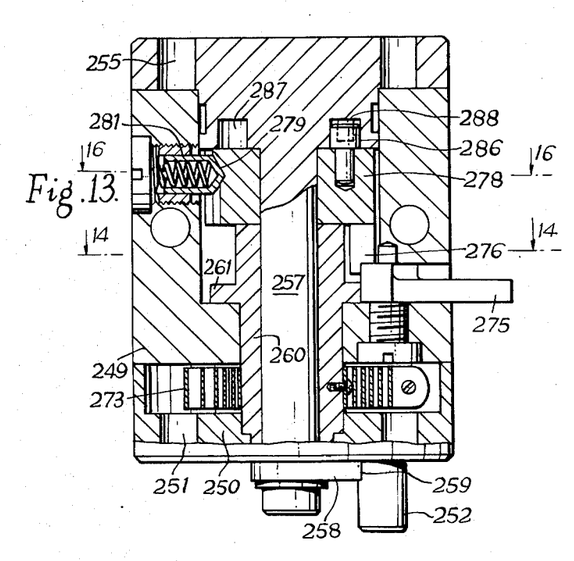
Figure 13 is a sectional view on the line 13—13 on Figure 12.
Figure 14:
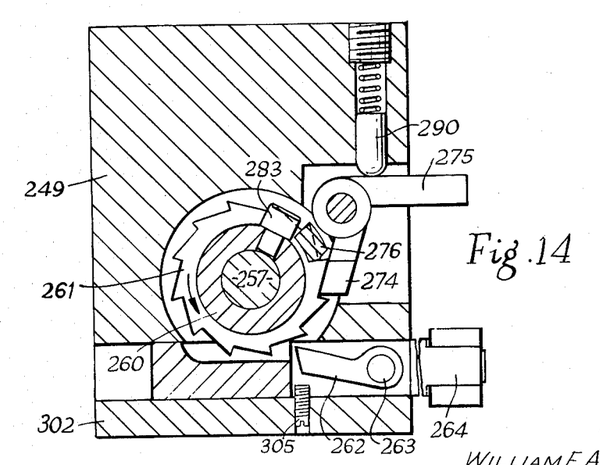
Figure 14 is a sectional view on the line 14—14 on Figure 13.

Surrounding the spigot 257 is a sleeve 260 on which is formed a ratchet wheel 261 which is engaged by a pawl 262 pivotally mounted at 263 on a plunger 264 having a pin 265 engaged in a slot 266 in a lever 267. The lever 267 is pivoted at 268 on the body 249 and carries a roller 270 which engages on a cam track 271 fixed on the machine frame. On each forward stroke of the machine the cam presses the lever 267 to cause the pawl 262 to advance the ratchet wheel 261 by one tooth. The pawl then returns under the influence of plunger 300 and spring 301 acting upon the lever 267, and the plunger 264 is retained by the stop 305. A spiral spring 273 surrounds the sleeve 260 and has its inner end fixed to the sleeve and its outer end attached to the barrel 250 whereby the spring can return the sleeve and ratchet. The ratchet is engaged by a non-return pawl 274 which normally engages in the ratchet wheel but can be released either by a finger trigger 275 or by an abutment 276.

The abutment 276 is carried by a release cam ring 278 which has two depressions 279, 280 in its periphery engaged alternately by a spring pressed plunger 281 whereby the ring 278 is held in one or other of two positions.

The sleeve 260 carries a pin 283 adapted to engage the abutment 276 thereby moving the cam ring 278 into one of its positions in one direction. The cam ring has a pin 286 engaged in an annular recess 287 in the barrel 253 and the barrel 253 has a pin 288 in the recess which can engage the pin 286 to move the cam ring 278 into its other position. Thus, the ratchet wheel 261, sleeve 260 and the projections 252 and 256 are rotated to the extent of one ratchet tooth on each forward stroke of the machine and are held at each position by the pawl 274 until this pawl is disengaged by pin 283 and abutment 276, whereupon the rotary parts are returned by spring 273. At the end of the return movement pin 288 moves the cam ring back to its normal position. Thus, at the end of each advance movement one of the pegs 252 operates the device 71 to bring about the return motion of the tool holder. At the end of the return motion one of the pegs 256 operates the device 73 to bring about a further forward advance of the tool holder. At the end of this advance movement, the next shorter peg 252 will permit a longer advance movement before it can operate device 71 to effect a further return motion.

The mechanism is enclosed within the body 249 by a cover 302 retained by screws 303 and the whole device is attached to the platform 68 by bolts 304.

To obtain constant length of stroke the longer rear peg 256 will operate successively with a short forward peg 252 and vice versa. No peg 256 is required to follow in operation the forward shortest peg. The rear pegs 256 may be as long as desired to reduce the length of the return strokes.

Should it be necessary at any time during the cycle of advance movements to return the mechanism to its original starting position the trigger 275 can be operated. Normally, the trigger 275 and pawl 274 is urged by spring pressed plunger 290 in the direction to hold the pawl 274 engaged in the ratchet wheel 261.

I claim:

1. An apparatus for controlling a series of advance and retraction movements of a tool holder comprising a body, means for moving the body parallel to the movements of the tool holder in timed relation therewith, a series of projections mounted rotatably on said body as an annular series and extending to different lengths in one direction parallel to the axis of rotation thereof, means operated by these projections and serving to initiate return movements of the tool holder, means controlled by the return movements to progressively rotate said series of projections to bring them successively into operation to initiate return movements at different degrees of advance of said tool holder, a second annular series of projections mounted on said body to rotate with the first series, but extending to different extents in the opposite direction to that of the first series, and means actuated by said second series of projections on the return movements of the tool holders and serving to initiate the forward movements of the tool holder at different degrees of return movement of the tool holder.

2. An apparatus for controlling a series of advance and retraction movements of a tool holder comprising a body, means for moving the body parallel to the movements of the tool holder in timed relation therewith, a series of projections mounted rotatably on said body as an annular series and extending to different lengths in one direction parallel to the axis of rotation thereof, means operated by these projections and serving to initiate return movements of the tool holder, means controlled by the return movements to progressively rotate said series of projections in one direction of rotation to bring them successively into operation to initiate return movements at different degrees of advance of said tool holder, restraining means for holding said projections against rotation in the opposite direction during a cycle of working operations, return means to rotate said projections in the opposite direction of rotation to restore them to starting position, and release means for moving said restraining means to a releasing position to enable the return means to rotate the projections back to their starting positions.

3. An apparatus for controlling a series of advance movements of a tool holder comprising a series of projections carried by a movable device and projecting therefrom to varying extents, actuating means to effect forward and return movements of the tool holder, control means to control said actuating means to initiate said forward and return movements, said control means being actuated by engagement therewith of said projections, means controlled by the return movements to progressively rotate said series of projections in one direction of rotation to bring them successively into operation to initiate return movements at different degrees of advance of said tool holder, restraining means for holding said projections against rotation in the opposite direction during a cycle of working operations, return means to rotate said projections in the opposite direction of rotation to restore them to starting positions, and release means for moving said restraining means to a releasing position to enable the return means to rotate the projections back to their starting position.

4. An apparatus for controlling a series of advance and retraction movements of a tool holder comprising a body, means for moving the body parallel to the movements of the tool holder in timed relation therewith, a series of projections mounted rotatably on said body as an annular series and extending to different lengths in one same direction parallel to the axis of rotation thereof, means operated by these projections and serving to initiate return movements of the tool holder, means controlled by the return movements to progressively rotate said series of projections in one direction of rotation to bring them successively into operation to initiate return movements at different degrees of advance of said tool holder, a ratchet wheel, a pawl for retaining the ratchet wheel in its successive positions, a member for disengaging the pawl from the ratchet wheel, a detent for holding said disengaging member in either of two positions, and abutment means rotatable with the projections and which move said disengaging member alternately into its two positions at the beginning and end of an operation.

References Cited in the file of this patent

UNITED STATES PATENTS

| | | |
|---|---|---|
| 2,550,148 | Harding | Apr. 24, 1951 |
| 2,684,017 | Schafer | July 20, 1954 |
| 2,695,535 | Carman | Nov. 30, 1954 |